Jan. 28, 1958 R. E. BECKER 2,821,405
SELF-LOCKING DRAWBAR ASSEMBLY
Filed Aug. 9, 1956 4 Sheets-Sheet 1

Inventor
Robert E. Becker
by Parker & Carter
Attorneys

Jan. 28, 1958   R. E. BECKER   2,821,405
SELF-LOCKING DRAWBAR ASSEMBLY
Filed Aug. 9, 1956   4 Sheets-Sheet 3

Inventor
Robert E. Becker by Parker & Carter
Attorneys

Jan. 28, 1958 R. E. BECKER 2,821,405
SELF-LOCKING DRAWBAR ASSEMBLY
Filed Aug. 9, 1956 4 Sheets-Sheet 4

Inventor
Robert E. Becker by Parker & Carter
Attorneys

United States Patent Office 2,821,405
Patented Jan. 28, 1958

2,821,405

SELF-LOCKING DRAWBAR ASSEMBLY

Robert E. Becker, Logansport, Ind., assignor to Logansport Machine Co., Inc., a corporation of Indiana Application August 9, 1956, Serial No. 603,007

6 Claims. (Cl. 279—119)

My invention is in the field of draw bar assemblies for use with machine tools, for example, turret lathes and the like, and is an improved type of self-locking draw bar mechanism constructed so that the chuck will not release the workpiece due to either centrifugal force or slippage.

A primary object of my invention is an improved self-locking draw bar assembly useable in a conventional machine tool.

Another object is a draw bar assembly which is self-locking and self-unlocking in response to actuation by a power cylinder, for example, a pneumatic or air operated device.

Another object is a self-locking draw bar assembly which can be easily assembled.

Another object is a self-locking draw bar assembly mounted on its power cylinder.

Another object is a self-locking draw bar assembly which is wholly enclosed in the machine spindle.

Another object is a self-locking draw bar assembly which can be used with any conventional chuck.

Other objects will appear from time to time in the ensuing specification and drawings in which.

Figure 1:
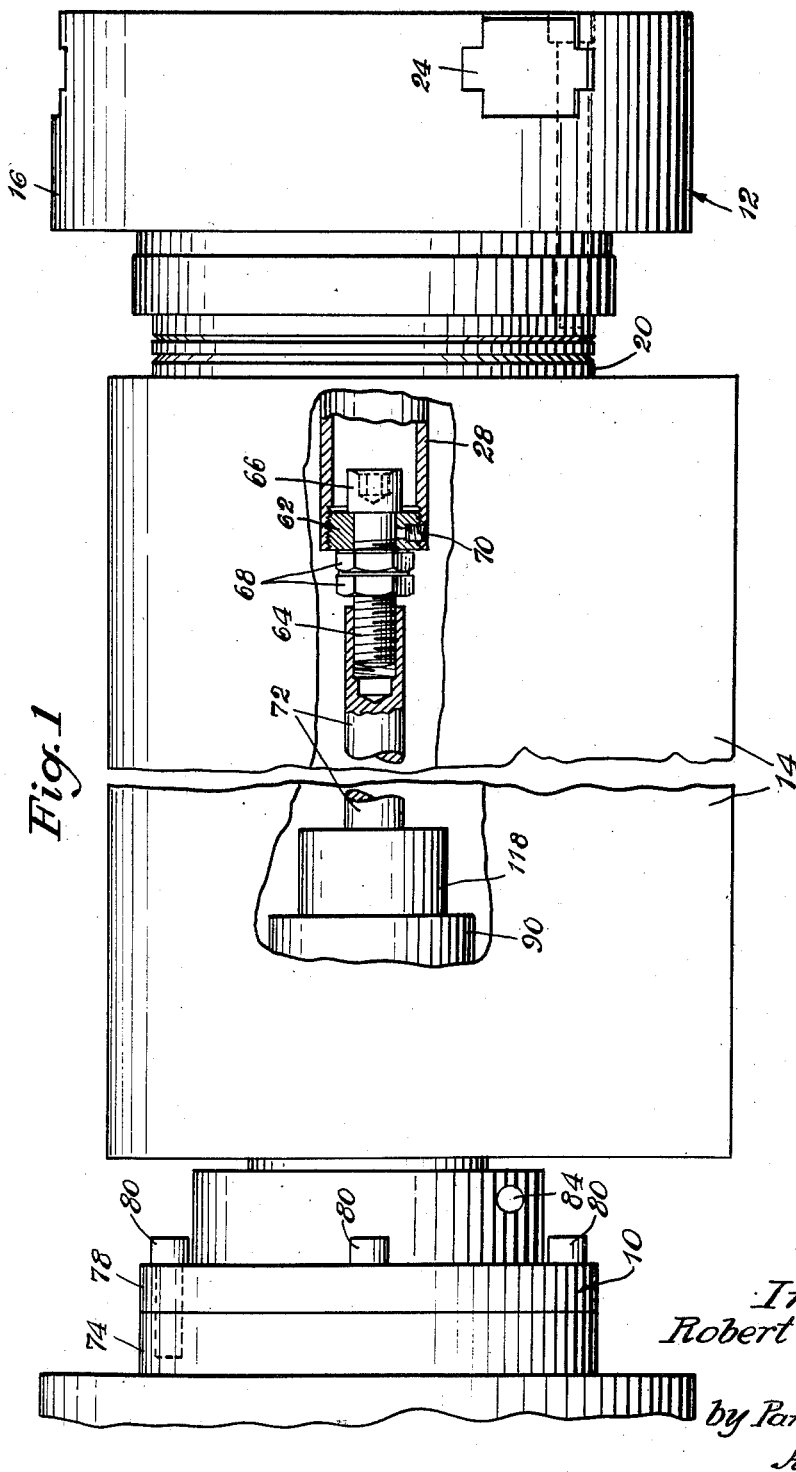
Figure 1 is a plan view, partly broken away, of a draw bar and chuck assembly.

In Figure 1, an air cylinder or the like is indicated generally at 10 which actuates a chuck indicated generally at 12 on a conventional machine tool, the housing of the machine tool being indicated generally at 14.

Figure 2:
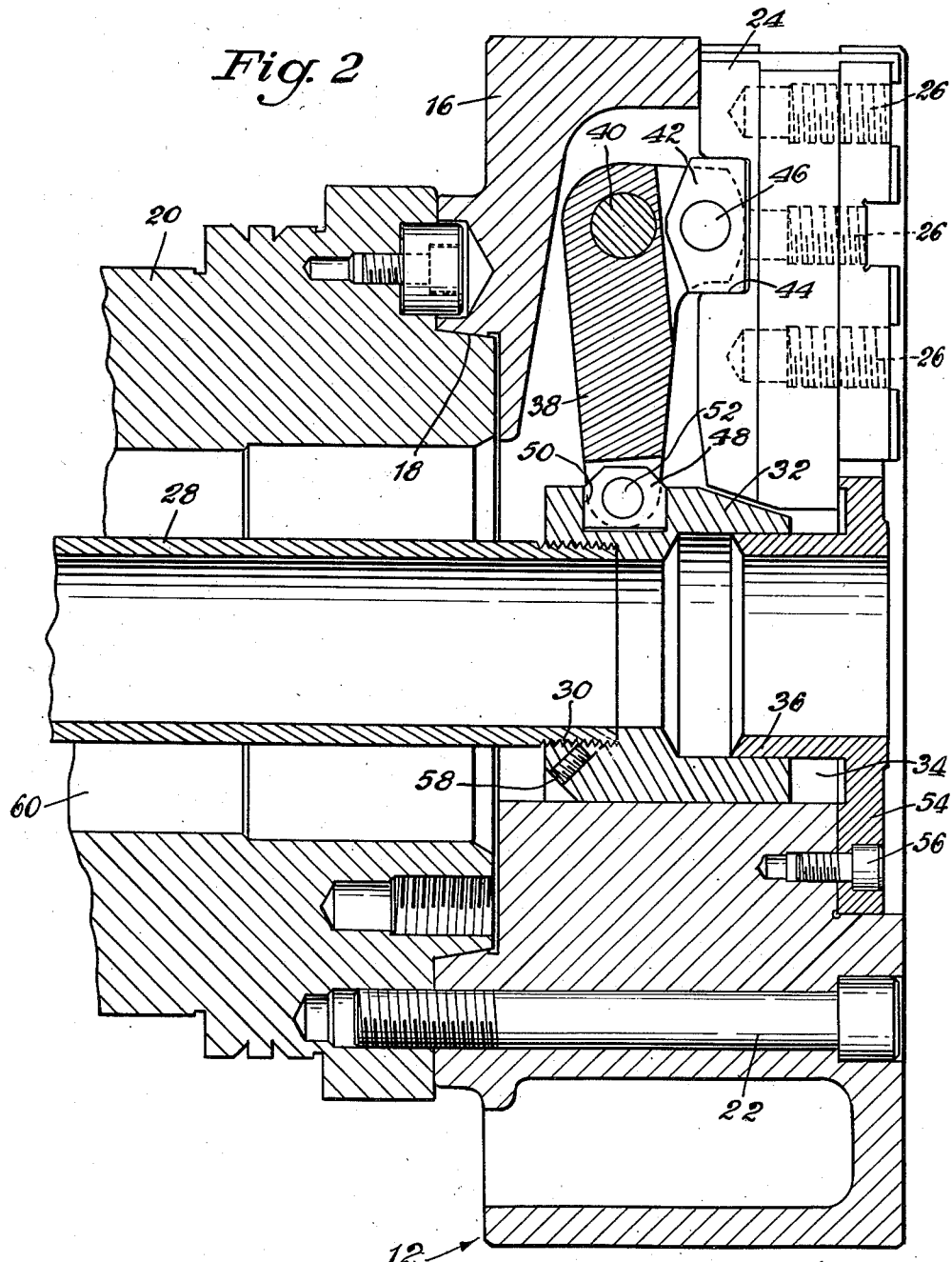
Figure 2 is a vertical section of the chuck.

In Figure 2, an axial section on an enlarged scale of a chuck is shown. 16 is the chuck housing. It is suitably recessed at 18 to engage and be mounted on a suitable lathe spindle, for example, such as indicated at 20 by a number of bolts 22 or other suitable connecting means. 24 indicates the three master jaws of the chuck although any number may be used. They are movable, radially toward and from the center of rotation. 26 indicates threaded holes for attaching false jaws to fit the workpiece. 28 is the draw tube actuated as set forth here and below. The draw tube is externally threaded at 30 into a draw sleeve 32 which is slidably mounted in a center bore 34 in the chuck housing on a pilot portion 36 or the like. 38 is the jaw actuating lever, three or more being used, one for each master jaw 24. Each lever is mounted on a pivot 40 supported in the chuck in a suitable manner. 42 is a jaw block slidable in the chuck jaw 24 in a direction parallel with the axis of rotation of the chuck, being closely fitted against radial movement in an aperture 44 in the chuck jaw. The jaw block 42 is pivoted to one end of the lever 38 as at 46. 48 is the draw sleeve block socketed in an aperture 50 in the draw sleeve 32 so as to permit radial movement and to prevent axial movement of the block with respect to the draw sleeve 32. The lever 38 and the draw sleeve block 48 are pivoted together at 52.

The pilot portion 36 may be a part of a bushing 54 held on the body by a suitable number of screws 56 or the like. The sleeve 32 may be provided with a suitable set screw 58 or the like to engage the threaded end of the draw tube 28.

In Figure 2, the machine spindle is suitably bored or channeled at 60 so that the draw tube may be moved back and forth axially. As best shown in Figure 1, the tube has a threaded plug 62 at its outer end. A threaded stud 64 extends through the collar and is beaded at one end at 66 and held by suitable lock nuts or jam nuts 68. The collar may have a set screw 70 if desired. A draw bar 72 has a threaded interior which is turned around the draw stud.

Figure 3:
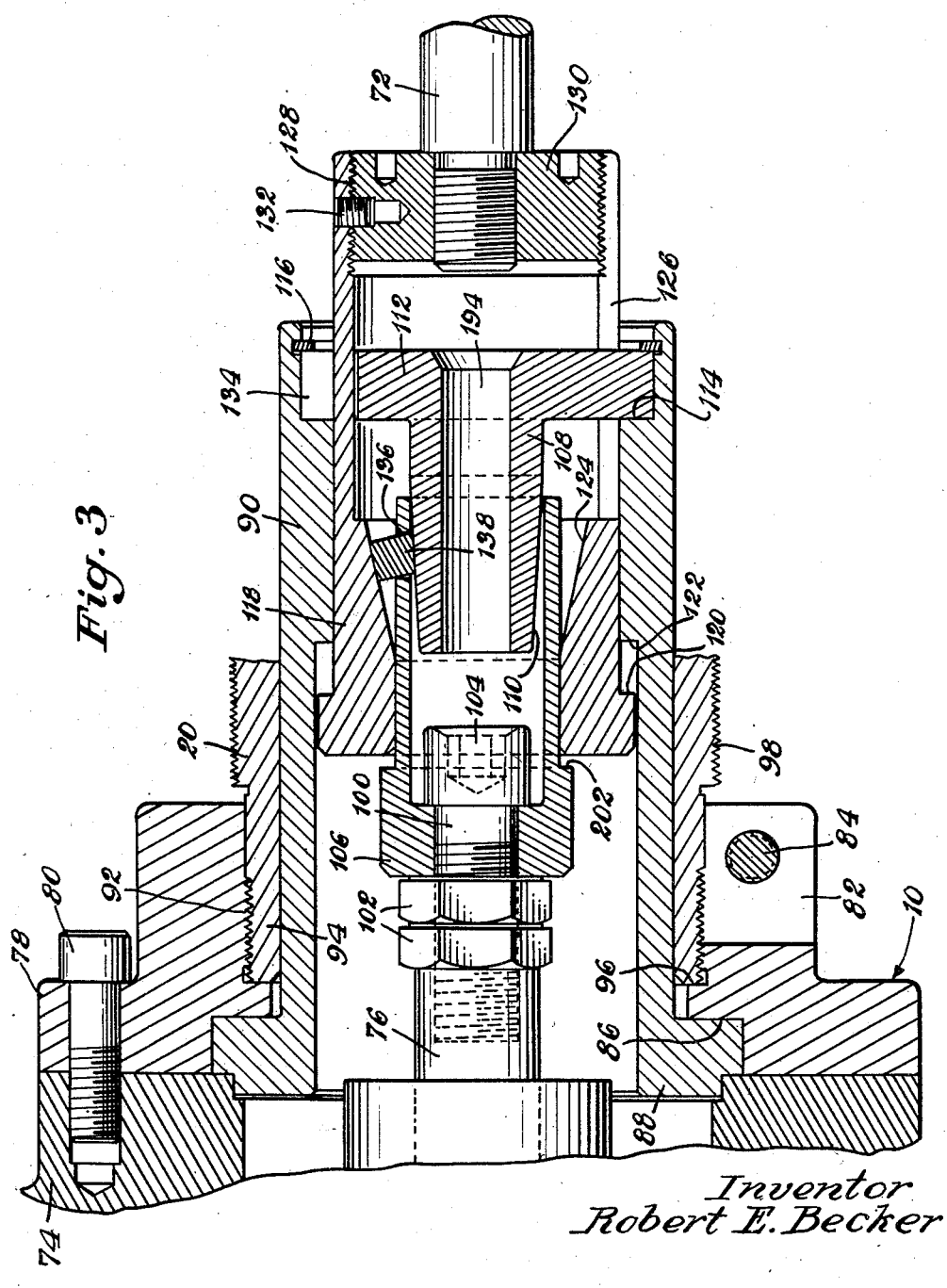
Figure 3 is a vertical section of the draw bar assembly and power cylinder.

In Figure 3, a suitable air cylinder, indicated generally at 74, has a piston rod 76 projecting from one end to actuate the chuck jaw. An adapter 78 in the form of a flanged collar or sleeve is connected to the face of the air cylinder by a suitable number of bolts 80 or otherwise, the adapter being split at 82 for a tightening bolt 84. The bore of the adapter is shouldered at 86 to lock a flange 88 on a tubular body member 90 against the air cylinder. A portion 92 of the adapter is threaded to receive the end 94 of the machine spindle engaging a shoulder 96 opposite the shoulder 86. The spindle may be threaded at 98.

A beaded draw stud 100 is threaded into the piston rod and held by suitable jam nuts 102 with its head 104 in a draw tube 106. The tube has a hollow interior which partially surrounds a lock plug 108 which has a tapered portion or extremity 110. The outer end of the lock plug is formed into a flange-like retaining plate 112 which is held against a shoulder 114 of the body member 90 by a snap ring or the like 116.

A draw bar sleeve 118 is positioned in the body element around the draw tube and has a shouldered portion 120 opposite a shoulder 122 in the body element. It also has a conical or tapered portion 124 which at least partially surrounds the tapered portion on the lock plug and is tapered in the same direction. The outer portion of the sleeve is somewhat cylindrical and is longitudinally slotted at 126 to provide a plurality of longitudinal legs which connect the tapered portion 124 with an outer threaded portion 128 which receives a plug 130, held by a set screw 132 or otherwise to which the other end of the draw bar is connected. The retaining plate 112 of the lock plug is suitably slotted at 134 so that the legs of the draw sleeve can freely pass through and reciprocate back and forth.

The draw tube is suitably apertured at 136 and has a plurality of draw blocks, one in each aperture, disposed between the tapered portion of the lock plug and the tapered surface on the draw bar sleeve, the draw blocks themselves being tapered so that they will interlock these two elements.

Figure 4:
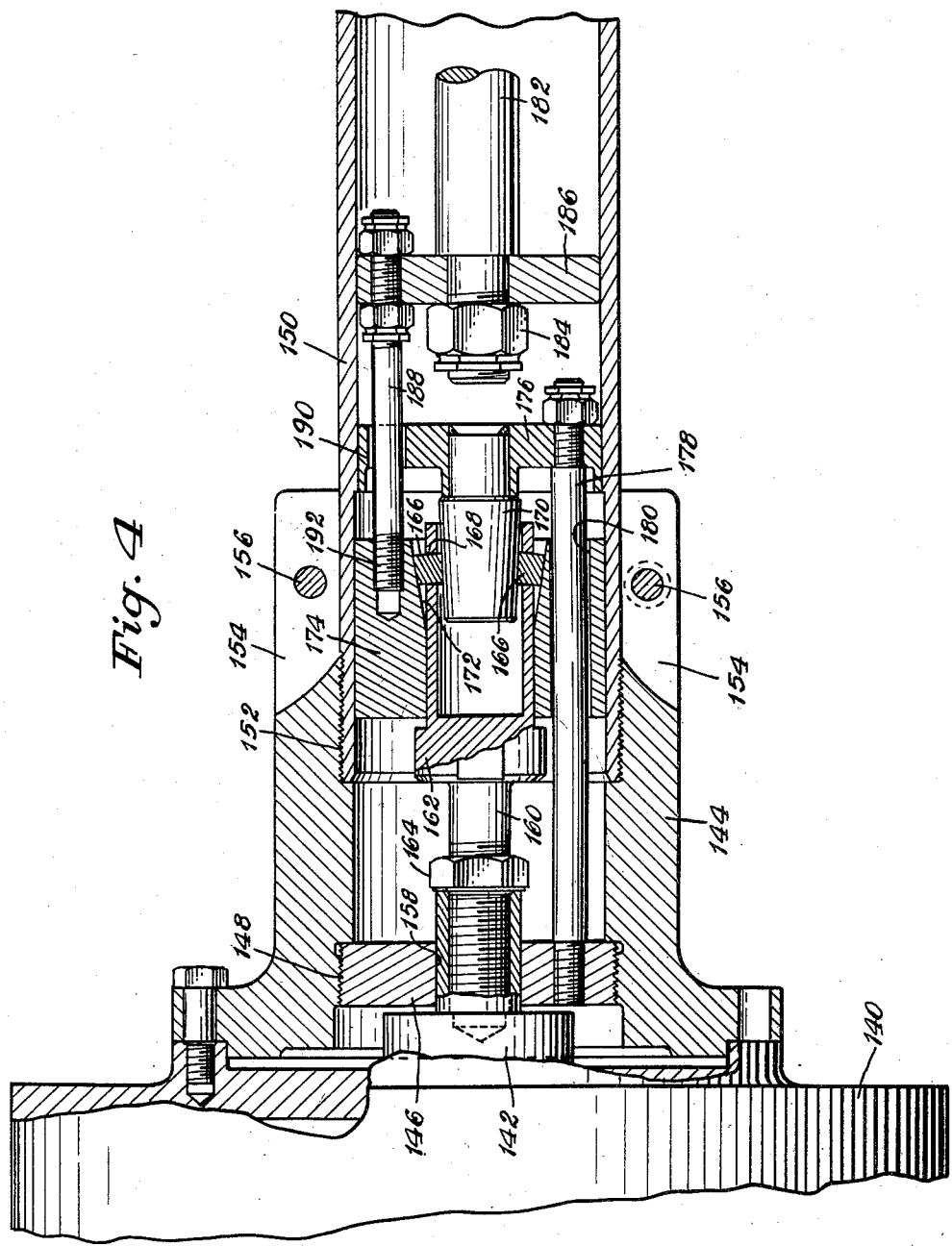
Figure 4 is a vertical section of a variant form.

In Figure 4, I have shown a variation in which the air cylinder and piston are indicated at 140 and 142, respectively. The sleeve-like adapter 144 is bolted or otherwise held on the face of the air cylinder and a suitable plate or plug 146 is threaded or otherwise secured in a threaded portion 148 in the bore of the sleeve. The machine spindle 150 is threaded into the sleeve at 152 and extends in a substantial distance. The outer end of the sleeve is double slotted at 154 or otherwise and is provided with tightening bolts 156 on each side. The plate 146 has a central opening 158 so that an extension 160 of the draw tube 162 be threaded into the piston rod, the rod being shown as extending through the plate 146 and held in place by a suitable lock nut 164. The draw blocks 166 are positioned in apertures 168 in the draw tube between an exterior conical surface or tapered area 170 on the lock plug and a corresponding interior conical surface 172 on the draw sleeve or collar 174.

The lock plug is welded or otherwise suitably secured in a retaining plate 176 which is held by a suitable number of studs 178 that extend through suitable longitudinal openings 180 in the draw sleeve and are secured to the plate or plug 146. This plug is held stationary relative to the housing. The draw bar 182 is held by a suitable nut 184 on a slider plate 186 which carries a suitable number of studs 188, held by nuts or otherwise, that pass through openings 190 in the retaining plate 176 and are threaded or otherwise connected to the draw sleeve at 192. The openings 190 for the studs or draw bolts 188 are angularly offset relative to the studs 178 as are the openings 180 in the draw sleeve relative to the threaded openings that receive the ends of the studs 188.

Thus, the retaining plate 176 is held rigid relative to the sleeve or adapter by the studs 178 and the draw sleeve 174 follows the draw bar.

In the form of Figure 3, the lock plug has a central aperture or central passage at 194 which facilitates mounting the draw stud 100.

In the Figure 4 form, the same central aperture is not necessary. Passage for the thrust of the piston is provided by the studs and the lock plug is held by an assembly of studs.

The use, operation and function of my invention are as follows:

The air cylinder is actuated by any suitable pneumatic controls or otherwise to force the piston in one direction or the other. The action of the piston moves the draw bar which in turn opens or closes the chuck jaws.

In certain chucks the locking mechanism for the jaws cannot be put in the body of the chuck itself or for other reasons it is desirable that the self-lock be disposed at the air cylinder.

In any event, the housing or enclosure for the lock mechanism is mounted on and directly rigidly attached to the air cylinder. The lock plug must be held stationary and at the same time the draw bar connection must by-pass it or go through it.

When the lathe is in operation and the chuck jaws are gripping the workpiece, centrifugal force cannot cause the jaws to move away from the work. The tapered lock plugs will tightly interlock the draw sleeve and the lock plug when the draw tube is pulled to the left, in either Figure 3 or Figure 4, by the piston of the air cylinder. The draw tube is provided with a shoulder 202, in Figure 3 for example, which will pick-up the draw bar sleeve 118 when the piston moves to the right and will force the tapered or outer conical surface away from the draw blocks to release the chuck jaws. The taper of the lock plugs is less than the taper 124 in the draw sleeve. Neither centrifugal force nor a power failure will cause the work to be released.

When the work is to be released, the draw stud is moved to the right which moves the draw tube and the draw blocks move with it. This releases the wedging or locking effect of the draw blocks between the two tapered or conical surfaces and the shoulder 202 on the draw tube engages the draw sleeve and moves it to the right which will force the draw bar to the right, thus positively opening and unlocking the chuck jaws.

While I have shown and described the preferred form and one modification of my invention, it should be understood that numerous additional modifications, substitutions, alterations and changes can be made without departing from the invention's fundamental theme. I, therefore, wish that my invention be unrestricted except as by the appended claims.

I claim:

1. In a self-locking draw bar assembly for use on a machine tool or the like, a generally cylindrical housing having a generally open bore and adapted at one end to be mounted on a power cylinder, a draw sleeve in the bore of the housing with one end extending out of the housing away from the cylinder and adapted to be connected to a draw bar, an interiorly tapered surface in the draw sleeve, a draw tube within and longitudinally movable with respect to the sleeve adapted to be connected to the piston rod of the power cylinder, the draw sleeve being longitudinally slotted to provide a plurality of longitudinal legs, an exteriorly tapered lock plug in the draw sleeve concentric with its interior taper, a retaining plate on the lock plug fixed in the housing and having a plurality of slots through which the legs on the draw sleeve extend, the draw tube having a plurality of apertures disposed in the area between the exterior taper on the lock plug and the interior taper on the draw sleeve, and a plurality of draw blocks, one in each aperture, the draw blocks being constructed and tapered relative to the interior taper on the draw sleeve and the exterior taper on the lock plug such that when the draw blocks are moved by the draw tube toward the power cylinder, they will wedge and interlock between the two tapered surfaces.

2. The structure of claim 1 in which the retaining plate is integral with the draw plug.

3. The structure of claim 2 in which the retaining plate is held between a shoulder on the housing and a snap ring.

4. The structure of claim 3 in which the lock plug is provided with a central passage to facilitate connecting the draw sleeve to the piston rod from the power cylinder.

5. In a self-locking draw bar assembly for use with a machine tool or the like, the generally cylindrical housing having a generally open center bore and adapted at one end to be mounted on a power cylinder, a draw sleeve in the bore of the housing having an interiorly tapered surface, a draw tube within and longitudinally movable with respect to the sleeve, adapted to be connected to the piston rod of the power cylinder, an exteriorly tapered lock plug in the draw sleeve concentric with its interior taper, a retaining plate for the lock plug, a mounting plate in the bore of the housing having a center aperture for passage and movement of the piston rod, a plurality of connecting bolts between the mounting plate and the retaining plate rigidly interlocking them to hold the lock plug stationary, the bolts passing through passages in the draw sleeve, a plurality of draw bolts connected to the draw sleeve and passing through openings in the retaining plate, the draw bolts being adapted to be connected to a draw bar, the draw tube having a plurality of apertures disposed in the area between the exterior taper on the lock plug and the interior taper on the draw sleeve, and a plurality of wedge-shaped draw blocks, one in each aperture, to interlock the draw sleeve and lock plug.

6. In a self-locking draw bar assembly for use with a machine tool or the like, a generally cylindrical housing having a generally open bore adapted at one end to be mounted on a power cylinder, a draw sleeve movably mounted in the bore of the housing and means for connecting it to a draw bar, an interiorly tapered surface in the draw sleeve, a draw tube within and longitudinally movable with respect to the draw sleeve and adapted to be connected to the piston rod of the power cylinder, an exteriorly tapered lock plug in the draw sleeve concentric with its interior taper, a retaining plate for the lock plug fixed with respect to the housing and having a plurality of openings through which at least a portion of the draw sleeve may extend, the draw tube having a plurality of apertures disposed in the area between the exterior taper on the lock plug and the interior taper on the draw sleeve, and a plurality of tapered draw blocks, one at each aperture, to lock and unlock the draw sleeve and lock plug when the draw tube is moved by the power cylinder.

References Cited in the file of this patent

UNITED STATES PATENTS

| | | |
|---|---|---|
| 1,419,780 | Todd | June 13, 1922 |
| 2,617,657 | Smith | Nov. 11, 1952 |
| 2,651,207 | Olson | Sept. 8, 1953 |
| 2,703,691 | Minnis | Mar. 8, 1955 |